(12) United States Patent
Wang (10) Patent No.: US 12,441,545 B2
(45) Date of Patent: Oct. 14, 2025

(54) AUTOMATIC DISTRIBUTION WALL

(71) Applicant: Beijing Jingdong Qianshi Technology Co., Ltd., Beijing (CN)

(72) Inventor: Jia Wang, Beijing (CN)

(73) Assignee: BEIJING JINGDONG QIANSHI TECHNOLOGY CO., LTD., Beijing (CN)

( * ) Notice: Subject to any disclaimer, the term of this patent is extended or adjusted under 35 U.S.C. 154(b) by 91 days.

(21) Appl. No.: 17/926,536

(22) PCT Filed: May 8, 2021

(86) PCT No.: PCT/CN2021/092255
§ 371 (c)(1),
(2) Date: Nov. 18, 2022

(87) PCT Pub. No.: WO2021/254018
PCT Pub. Date: Dec. 23, 2021

(65) Prior Publication Data
US 2024/0278992 A1    Aug. 22, 2024

(30) Foreign Application Priority Data
Jun. 15, 2020 (CN) .......................... 202010544395.7

(51) Int. Cl.
*B65G 1/137* (2006.01)
*B65G 47/64* (2006.01)

(52) U.S. Cl.
CPC ......... *B65G 1/1373* (2013.01); *B65G 47/643* (2013.01); *B65G 47/648* (2013.01)

(58) Field of Classification Search
CPC ...................................................... B65G 37/02
See application file for complete search history.

(56) References Cited

U.S. PATENT DOCUMENTS

| | | | |
|---|---|---|---|
| 10,577,189 B2 * | 3/2020 | Itoh | B65G 47/244 |
| 2003/0161714 A1 | 8/2003 | Blattner et al. | |
| 2019/0382208 A1 | 12/2019 | Meschenmoser et al. | |

FOREIGN PATENT DOCUMENTS

| | | |
|---|---|---|
| CN | 202575364 U | 12/2012 |
| CN | 104355274 A | 2/2015 |
| CN | 204883991 U | 12/2015 |
| CN | 106276038 A | 1/2017 |
| CN | 207090258 U | 3/2018 |
| CN | 108202964 A | 6/2018 |
| CN | 108455157 A | 8/2018 |
| CN | 208307638 U | 1/2019 |
| CN | 109625735 A | 4/2019 |
| CN | 109775212 A | 5/2019 |
| CN | 209668177 U | 11/2019 |

(Continued)

*Primary Examiner* — William R Harp
(74) *Attorney, Agent, or Firm* — Venable LLP; Henry J. Daley (57) ABSTRACT

An automatic distribution wall is provided, comprising: at least one sorting and conveying assembly which is arranged linearly, wherein the sorting and conveying assembly comprises a carrying part and a rotating part, the carrying part is used for carrying and conveying articles, and the rotating part is connected to a base of the carrying part to drive the carrying part to rotate about a vertical direction so as to adjust the direction of conveyance of articles by the carrying part to a storage position facing the articles.

11 Claims, 7 Drawing Sheets

(56) References Cited

FOREIGN PATENT DOCUMENTS

| | | |
|---|---|---|
| CN | 111038892 A | 4/2020 |
| CN | 210479814 U | 5/2020 |
| CN | 210535367 U | 5/2020 |
| CN | 112298879 A | 2/2021 |
| CN | 213084337 U | 4/2021 |
| DE | 3830194 A1 | 3/1990 |
| JP | S62-103223 | 5/1987 |
| JP | 2007-269478 A | 10/2007 |
| JP | 2012-250823 A | 12/2012 |
| JP | 2017-176942 A | 10/2017 |
| JP | 6621021 B2 | 12/2019 |

\* cited by examiner

AUTOMATIC DISTRIBUTION WALL

The present patent application is a national stage of International Application No. PCT/CN2021/092255, filed on May 8, 2021, which claims priority to Chinese Patent Application No. 202010544395.7 titled "AUTOMATIC DISTRIBUTION WALL" filed on Jun. 15, 2020. Both of the aforementioned applications are hereby incorporated by reference in their entireties.

TECHNICAL FIELD

Embodiments of the present disclosure relate to the field of machinery, more particularly, to the field of intelligent warehousing, and more particularly, to an automatic put wall.

BACKGROUND

Automation technologies in the logistics industry have developed rapidly, and various sorting and transmission equipment can effectively improve a work efficiency. In existing technologies, an article sorting apparatus includes a loop sorting machine and a linear sorting machine. The loop sorting machine needs to be equipped with a plurality of conveying trolleys, and the linear sorting machine needs to transport a trolley to convey articles to and fro.

SUMMARY

Embodiments of the disclosure provide an automatic put wall.

Some embodiment of the present disclosure provide an automatic put wall, includes: at least one set of sorting-conveying assemblies distributed linearly, wherein each sorting-conveying assembly comprises a carrying portion and a rotating portion, the carrying portion is configured to carry and convey articles, and the rotating portion is configured to be connected to a base of the carrying portion to bring the carrying portion to rotate in a vertical direction, so as to adjust a direction in which the carrying portion conveys an article to a storage position toward the article.

In some embodiments, the carrying portion comprises a conveyor belt and a horizontal driving mechanism, the horizontal driving mechanism is configured to drive the conveyor belt to move in a horizontal direction for conveying an article located on the conveyor belt.

In some embodiments, the carrying portion further comprises a tray, an central region of the tray is hollowed out to expose the conveyor belt, and an upper surface of the tray is not higher than an upper surface of the conveyor belt.

In some embodiments, the rotating portion comprises a rotating shaft having an axis in a vertical direction and a rotating driving mechanism, one end of the rotating shaft is fixedly connected to the base of the carrying portion, and the other end of the rotating shaft is connected to the rotating driving mechanism; and the rotation driving mechanism is configured to drive the rotating shaft to rotate in the vertical direction.

In some embodiments, each sorting-conveying assembly comprises two carrying portions; and the rotating portion includes two rotating shafts, which are fixedly connected respectively to the base of each of the two carrying portions; and the rotating portion further comprises a synchronous transmission mechanism through which the rotating driving mechanism drives the two rotating shafts to rotate synchronously in the vertical direction, so as to bring the two carrying portions to rotate synchronously in the vertical direction.

In some embodiments, the synchronous transmission mechanism comprises a synchronous conveyor belt and two synchronous belt pulleys cooperating with the synchronous conveyor belt, each of the synchronous belt pulleys being connected to one of the rotating shafts; and the rotation driving mechanism is connected to the synchronous conveyor belt, and is configured to drive the synchronous conveyor belt to move, so as to bring the two synchronous belt pulleys and the rotating shafts connected to the synchronous pulleys to rotate in the vertical direction.

In some embodiments, the automatic put wall further includes an auxiliary roller and an auxiliary motor for driving the auxiliary roller to rotate, wherein the auxiliary roller is provided between a sorting-conveying assembly and a notch, and is driven by the auxiliary motor to move the article from the carrying portion to the storage position of the article.

In some embodiments, the automatic put wall further includes a holding portion disposed at an article input end of the automatic put wall and configured to temporally store the article and convey the article to the sorting-conveying assembly.

In some embodiments, the automatic put wall further includes a conveying bracket and a notch bracket disposed at a lateral side of the conveying bracket, the conveying bracket having a multilayer structure, each layer being provided with a set of sorting-conveying assemblies distributed linearly; and the notch bracket has a multilayer structure, and each layer is provided with a plurality of notches serving as the storage position for the article.

Some embodiments of the present disclosure provide a system for sorting articles, including an automatic put wall and an alternating lifter, wherein the alternating lifter is configured to convey a received article to the automatic put wall; and the automatic put wall is configured to convey the article conveyed by the alternating lifter to a designated notch.

In some embodiments, the system further includes an upper packet section for conveying the received article to the alternating lifter; and the upper packet section comprises an article transport assembly for transporting the article in a horizontal direction, and a position adjustment assembly for adjusting a horizontal position of the article transport assembly to match a direction in which the article transport assembly transports the article with the alternating lifter.

In some embodiments, the system further includes a stacker for handling a notch, wherein the stacker is configured to remove and stack a notch storing articles from the automatic put wall, and to move an empty notch to a designated position on the automatic put wall.

BRIEF DESCRIPTION OF THE DRAWINGS

Other features, objectives, and advantages of the present disclosure will become more apparent by reading the detailed description of non-limiting embodiments made with reference to the following drawings, wherein.

Reference numerals: 10—a automatic put wall; 20—alternating lifter; 30—upper packet section; 40—stacker;
 100—sorting-conveying assembly; 110—carrying portion; 111—base; 112—horizontal driving mechanism; 113—conveyor belt; 114—tray; 120—rotating portion; 121—rotating shaft; 122—rotating driving mechanism; 123—synchronous transmission mechanism; 124—synchronous belt pulley; 125—synchronous conveyor belt; 130—auxiliary roller; 140—holding portion; 150—conveying bracket; 160—notch bracket; 170—notch;
 210—first lifting component; 211—first bearing portion; 220—second lifting component; 221—second bearing portion; 222—second vertical slide rail; 230—relative movement driving component;
 310—article transport assembly; 320—position adjustment assembly.

DETAILED DESCRIPTION OF EMBODIMENTS

The present disclosure is described in further detail below with reference to the accompanying drawings and examples. It is to be understood that the specific embodiments described herein are merely illustrative of the related invention and are not restrictive of the invention. It is also to be noted that, for ease of description, only parts related to the invention are shown in the drawings.

It is noted that the embodiments in the present disclosure and the features in the embodiments may be combined with each other without conflict. The present disclosure will now be described in detail with reference to the accompanying drawings and examples.

Figure 1:
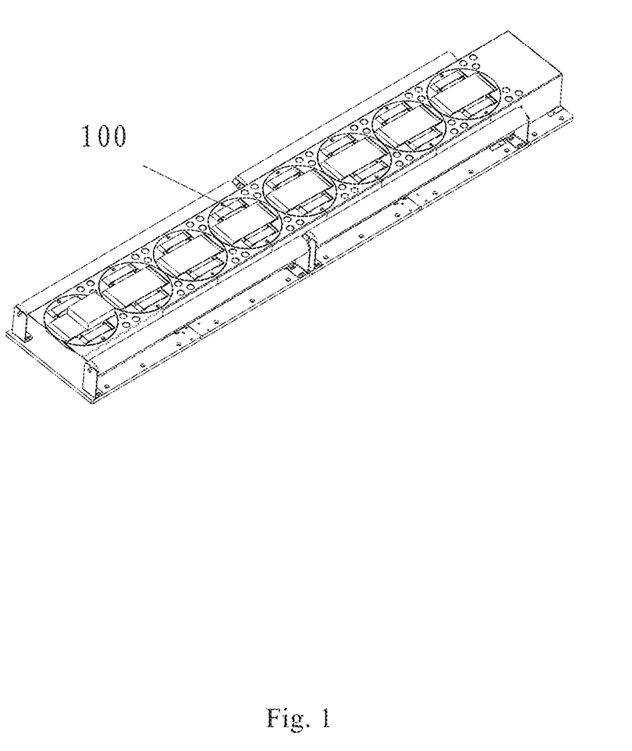
FIG. 1 is a schematic general structure diagram of a first embodiment of an automatic put wall of the present disclosure.
Figure 2:
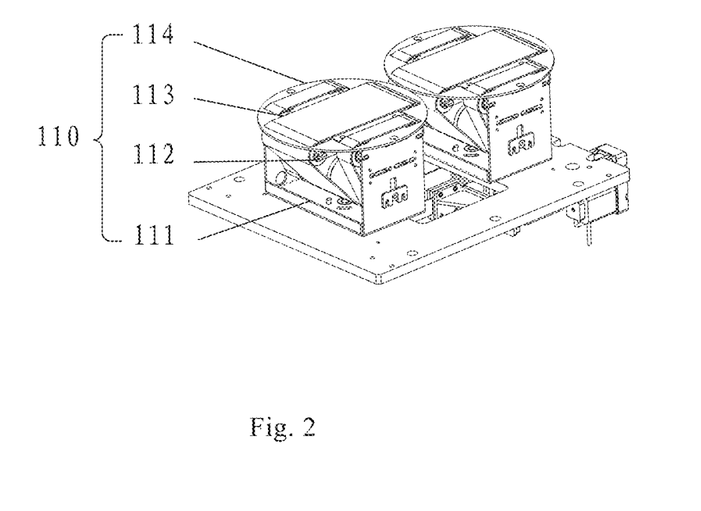
FIG. 2 is a schematic structural diagram of a sorting-conveying assembly of the first embodiment of the automatic put wall of the present disclosure.
Figure 3:
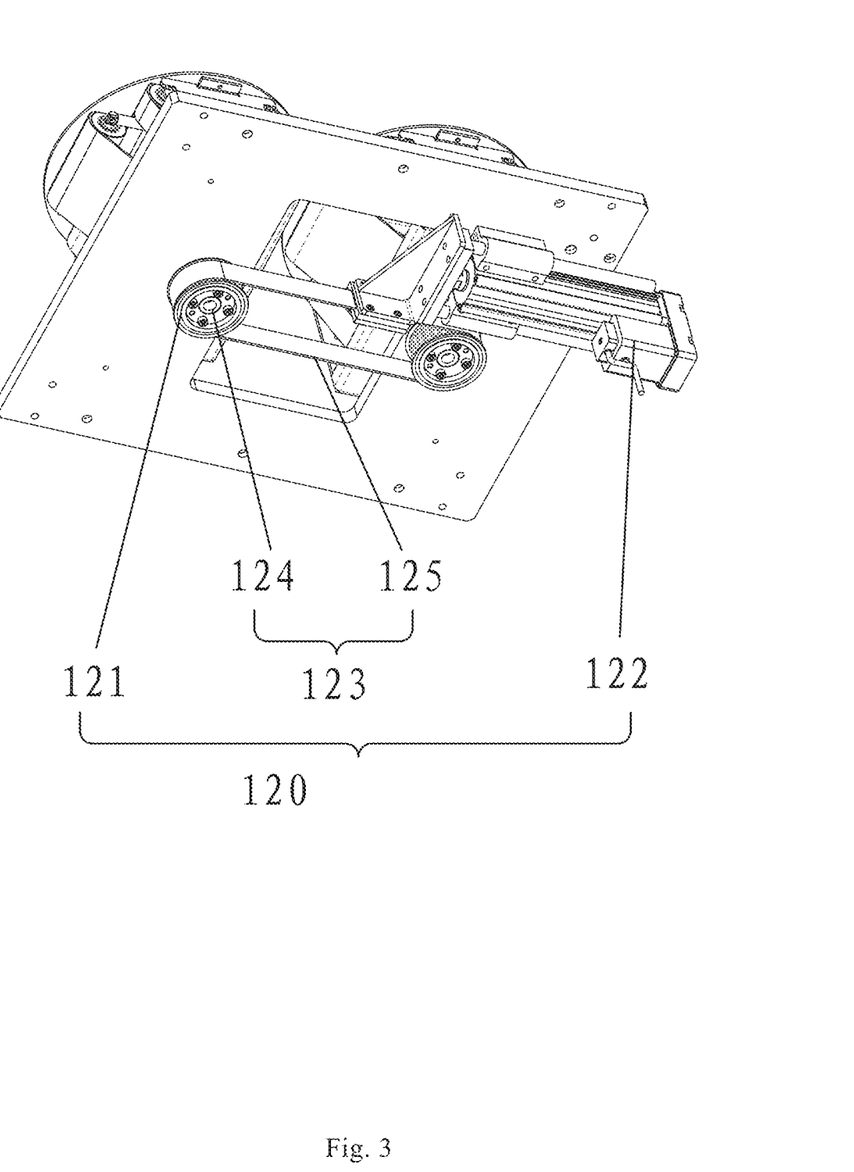
FIG. 3 is a schematic bottom structure diagram of the sorting-conveying assembly of the first embodiment of the automatic put wall of the present disclosure.

Referring to FIGS. 1, 2, and 3, FIG. 1 illustrates a general structural diagram of a first embodiment of an automatic put wall of the present disclosure, FIG. 2 illustrates a structural diagram of a sorting-conveying assembly of the first embodiment of the automatic put wall of the present disclosure, and FIG. 3 illustrates a schematic bottom structure diagram of the sorting-conveying assembly of the first embodiment of the automatic put wall of the present disclosure.

As shown in FIG. 1, the automatic put wall of the present disclosure includes at least a set of sorting-conveying assemblies 100 distributed linearly, each sorting-conveying assembly 100 including a carrying portion 110 and a rotating portion 120. The carrying portion 110 is configured to carry and convey articles, and the rotating portion 120 is configured to be connected to a base 111 of the carrying portion to rotate the carrying portion 110 in a vertical direction, so as to adjust a direction in which the carrying portion 110 conveys the articles to a storage position toward the articles.

As an example, to-be-sorted articles are sequentially passed through the plurality of sorting-conveying assemblies 100 under a conveying action of the carrying portion 110. When the to-be-sorted articles reach a predetermined position, the carrying portion 110 of the sorting-conveying assembly 100 corresponding to the predetermined position stops the conveying action, and the rotating portion 120 brings the carrying portion 110 to rotate by a predetermined angle, so that the conveying direction of the carrying portion 110 is turned to the storage position of the to-be-sorted articles (generally, at a lateral position of the automatic put wall, a corresponding predetermined angle being 90°), and then the carrying portion 110 starts the conveying action to convey the to-be-sorted articles to the storage position.

Referring to FIG. 2, in some alternative implementations of the present embodiment, the carrier portion 110 includes a conveyor belt 113 and a horizontal driving mechanism 112, the horizontal driving mechanism 112 being configured to drive the conveyor belt to move in a horizontal direction for conveying an article located on the conveyor belt 113. As shown in FIG. 2, the horizontal driving mechanism 112 may include a motor by which the conveyor belt 113 is brought to rotate through a roller.

In other alternative implementations of the present embodiment, the conveyor belt 113 may have a split-type structure, and the horizontal driving mechanism 112 may drive each split-type conveyor belt to perform synchronous movement, thereby reducing a manufacturing cost of the conveyor belt 113.

With continued reference to FIG. 2, in some alternative implementations of the present embodiment, the carrier portion 110 further includes a tray 114, an central region of the tray 114 is hollowed out to expose the conveyor belt 113, and an upper surface of the tray 114 is not higher than an upper surface of the conveyor belt 113, so that the to-be-sorted articles can be prevented from slipping off the conveyor belt 113.

Referring next to FIG. 3, in some alternative implementations of the present embodiment, the rotating portion 120 includes a rotating shaft 121 having an axis in a vertical direction and a rotating driving mechanism 122. One end of the rotating shaft 121 is fixedly connected to the base 111 of the carrying portion 110 and the other end of the rotating shaft 121 is connected to the rotating driving mechanism 122. The rotating driving mechanism 122 is configured to drive the rotation shaft 121 to rotate in the vertical direction. For example, the rotating driving mechanism 122 may be a cylinder or a hydraulic cylinder, to drive, by a piston rod, the rotating shaft 121 to rotate. For another example, the rotating driving mechanism 122 may also be a motor.

With continued reference to FIG. 3, in some alternative implementations of the present embodiment, the sorting-transport assembly 100 includes two carrying portions 110. The rotating portion 120 includes two rotating shafts 121, each being fixedly connected to the base 111 of one of the two carrying portions 110, respectively. The rotating portion 120 further includes a synchronous transmission mechanism 123, and the rotating driving mechanism 122 drives the two rotating shafts 121 to rotate synchronously in the vertical direction through the synchronous transmission mechanism 123, so as to drive the two carrying portions 110 to rotate synchronously in the vertical direction. In the present implementation, the two carrying portions 110 may simultaneously carry the same bulky to-be-sorted article to avoid slipping of the to-be-sorted article during the sorting process.

Further, the synchronous transmission mechanism 123 in the present embodiment may further include a synchronous conveyor belt 125 and two synchronous belt pulleys 124 cooperating with the synchronous conveyor belt, each of the synchronous belt pulleys 124 being connected to a rotating shaft 121, respectively. The rotating driving mechanism 122 is connected to the synchronous conveyor belt 125, and is configured to drive the synchronous conveyor belt 125 to move, so as to bring the two synchronous belt pulleys 124 and the rotating shafts 121 connected to the synchronous belt pulleys 124 to rotate in the vertical direction.

For example, the rotating driving mechanism 122 may include a cylinder or a hydraulic cylinder and a mating piston rod. One end of the piston rod is fixedly connected to the synchronous conveyor belt 124 for driving the synchronous conveyor belt 124 to move, so as to bring the two synchronous belt pulleys 124 and the rotating shafts 121 respectively connected to the synchronous belt pulleys 124 into synchronous rotation, thereby realizing synchronous rotation of the two bearing portions 110. In another specific example of the present embodiment, the synchronous belt pulley 124 may also be a chain, and accordingly, the synchronous belt pulley 124 may be a chain wheel.

Figure 4:
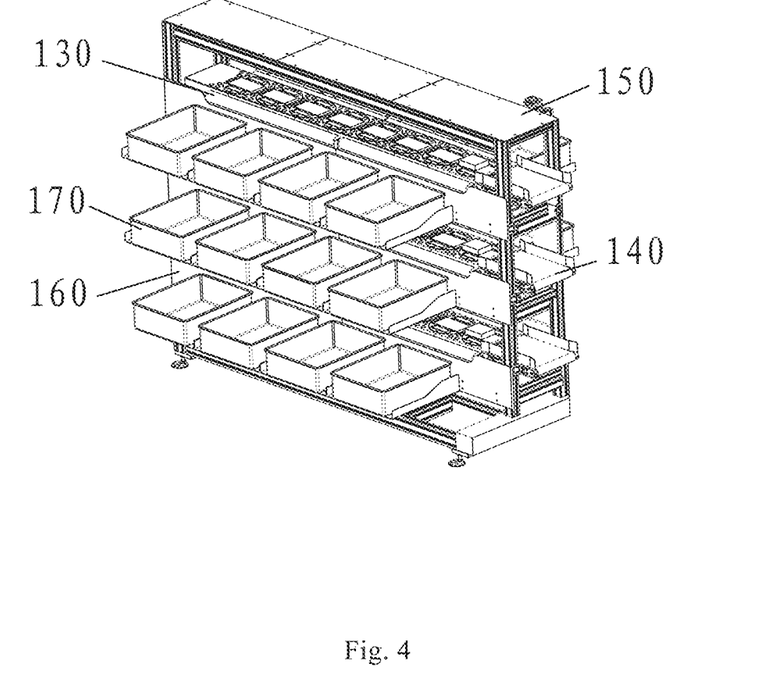
FIG. 4 is a schematic structural diagram of a second embodiment of the automatic put wall of the present disclosure.

Referring next to FIG. 4, there is shown a schematic structural diagram of a second embodiment of the automatic put wall of the present disclosure. In the present embodiment, the automatic put wall further includes an auxiliary roller 130 and an auxiliary motor (not shown) for driving the auxiliary roller 130 to rotate. The auxiliary roller 130 is provided between the sorting-conveying assembly 100 and a notch 170 and is driven by the auxiliary motor to bring an article into a storage position of the article.

In the present embodiment, after a to-be-sorted article has reached a specified position through the plurality of sorting-conveying assemblies 110, the carrying portion 110 rotates by a predetermined angle under the action of the rotating driving mechanism 122, and then the carrying portion 110 conveys the to-be-sorted article to the notch 170. As a contact area between the to-be-sorted article and the carrying portion 110 becomes smaller and smaller, a conveying force applied to the to-be-sorted article becomes smaller and smaller. At this time, the auxiliary motor drives the auxiliary roller 130 to rotate, causing the to-be-sorted article to move from the carrying portion 110 to the notch 170 more smoothly.

In some alternative implementations of the present embodiment, the automatic put wall further includes a holding portion 140 that is disposed at an article input end of the automatic put wall and configured to temporally store an article and convey the article to the sorting-conveying assembly 110. For example, the holding portion 140 may be a conveyor belt mechanism. In order to avoid production accidents (such as slipping of the to-be-sorted article) caused by too many to-be-sorted articles on the sorting-conveying assembly 100 in the automatic put wall, the to-be-sorted article may be temporarily stored in the holding portion 140. After the number of the to-be-sorted articles on the sorting-conveying assembly 100 meets a preset requirement, the to-be-sorted articles on the holding portion 140 may be conveyed to the sorting-conveying assembly 100 by the conveyor belt mechanism.

It will be appreciated that the holding section 140 may also be the sorting-conveying assembly 100 for temporally storing to-be-sorted articles.

In some alternative implementations of the present embodiment, the automatic put wall further includes a conveying bracket 150 and a notch bracket 160 disposed in a lateral side of the conveying bracket 150. The conveying bracket 150 has a multilayer structure, each layer of which is provided with a set of sorting-conveying assemblies 100 distributed in a straight line. The notch bracket 160 has a multilayer structure, and each layer is provided with a plurality of notches 170 serving as storage positions for the articles. In the present embodiment, each sorting-conveying assembly constitutes a sorting line, and a plurality of sorting lines work at the same time, which helps to improve the sorting efficiency of the automatic put wall.

Figure 5:
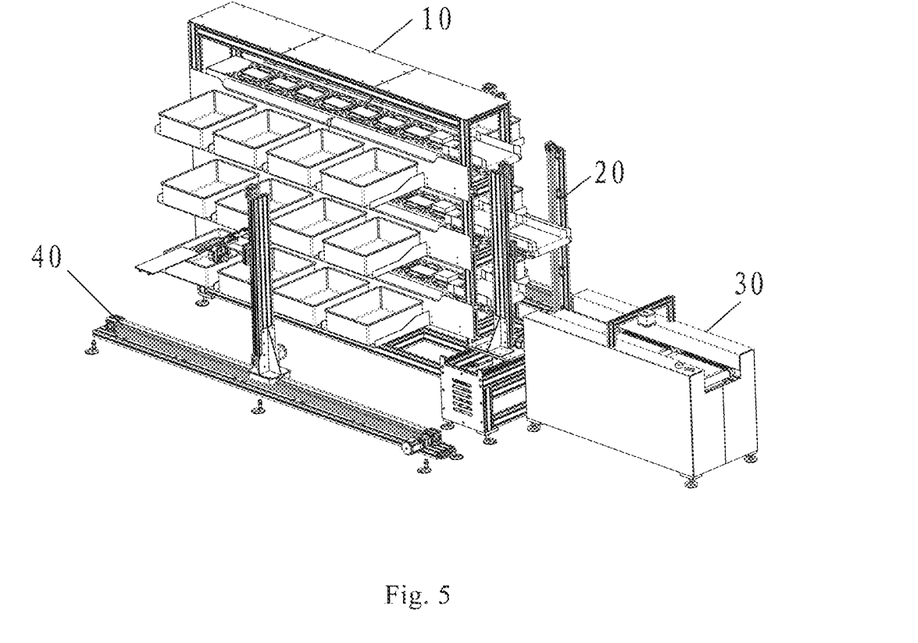
FIG. 5 is a schematic structural diagram of a embodiment of a system for sorting articles of the present disclosure.

Then referring to FIG. 5, an embodiment of the present disclosure provides an article sorting system, including the automatic put wall 10 as described above and an alternating lifter 20, the alternating lifter 20 is configured to convey a received article to the automatic put wall 10. The automatic put wall 10 is configured to convey the article conveyed by the alternating lifter 20 to a designated notch.

In the present embodiment, the automatic put wall has a multilayer structure, and each layer is provided with a sorting line composed of a set of sorting-conveying assemblies 100. The alternating lifter 20 is configured to convey to-be-sorted articles in the vertical direction to convey the received to-be-sorted article to the sorting line designated in the automatic put wall 10. For example, the alternating lifter 20 may convey the to-be-sorted articles to the holding portion 140 in the designated layer of the automatic put wall 10 or a sorting-conveying assembly 100 located at the beginning of the sorting line, and then a to-be-sorted article is conveyed to a designated notch 170 by the plurality of sorting-conveying assemblies 100.

Figure 6:
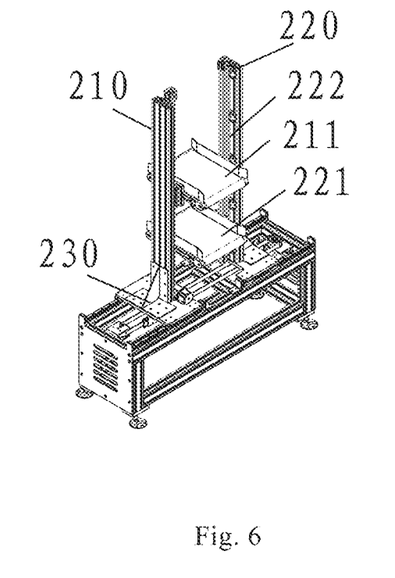
FIG. 6 is a schematic structural diagram of an alternating lifter in an embodiment of the system for sorting articles of the present disclosure.

With further reference to FIG. 6, there is shown a schematic structural diagram of the alternating lifter in the system for sorting articles of the present disclosure. In some alternative implementations of the present embodiment, the alternating lifter 20 may include a first lifting component 210, a second lifting component 220, and a relative movement component 230. The first lifting component 210 includes a first vertical slide rail (not shown), a first bearing portion 211 slidable along the first vertical slide rail, and a first driving means (not shown) for driving the first bearing portion 211 to slide along the first vertical slide rail. The second lifting component 220 includes a second vertical slide rail 222, a second bearing portion 221 slidable along the second vertical slide rail 222, and a second driving means (not shown) for driving the second bearing portion 221 to slide along the second vertical slide rail. The relative movement driving component 230 is used to drive the first lifting component 210 and the second lifting component 220 to move toward one another to a first position state, and to move away from one another to a second position state. In the first position state, the first bearing portion 211 and the second bearing portion 221 are arranged in an up-down alignment. In the second position state, the projections of the first bearing portion 211 and the second bearing portion 221 on the horizontal plane are completely staggered.

In the present implementation, the first bearing portion 211 and the second bearing portion 221 for carrying the to-be-sorted article are moved in the vertical direction respectively along the first vertical slide rail and the second vertical slide rail 222, so that the two lifting components can be operated simultaneously, thereby ensuring the conveying efficiency of the to-be-sorted articles while saving the space occupied by the lifter.

In a specific scenario, the first lifting component 210 and the second lifting component 220 of the alternating lifter 20 at a certain moment are in the first position state, the first bearing portion 211 rests at the bottom of the first lifting component 210 to receive the to-be-sorted articles, and the second bearing portion 221 rests at the top of the second lifting component 220 to convey the to-be-sorted articles to the holding portion 140 of the automatic put wall 10. Thereafter, the first bearing portion 211 carrying the to-be-sorted article moves upward along the first vertical slide rail, and the second bearing portion 221 moves downward along the second vertical slide rail 221. At this time, the relative movement driving component 230 drives the first lifting component 210 and the second lifting component 220 to move away from each other until the projections of the first bearing portion 211 and the second bearing portion 221 in the horizontal plane are completely staggered, so as to avoid a collision between the first bearing portion 211 and the second bearing portion 221. At this point, the first lifting component 210 and the second lifting component 220 of the alternating lifter 20 are in the second position state. After the first bearing portion 211 and the second bearing portion 221 are staggered in the vertical direction, the relative movement driving component 230 drives the first lifting component 210 and the second lifting component 220 to move toward each other, so that the first lifting component 210 and the second lifting component 220 of the alternating lifter 20 return to the first position state, in which the first bearing portion 211 can transport the to-be-sorted article to a designated layer of the automatic put wall 10, and the second bearing portion 221 can receive the next to-be-sorted article at the bottom of the second lifting component 200.

Alternatively, the first bearing portion 211 may include a first conveying motor (not shown) and a first conveying belt (not shown). The first conveying motor is configured to drive the first conveying belt to move in a horizontal direction for conveying the articles on the first conveying belt to a designated position. The second bearing portion 221 may include a second conveying motor (not shown) and a second conveying belt (not shown). The second conveying motor is configured to drive the second conveying belt to move in the horizontal direction for conveying articles on the second conveying belt to a designated position.

The first lifting component 210 includes a first bracket (not shown) to which the first vertical slide rail is fixed. The second lifting component 220 includes a second bracket (not shown) to which the second vertical slide rail 222 is fixed. The alternating lifter 20 may further include a horizontal slide rail and a first horizontal slider and a second horizontal slider movable along the horizontal slide rail, an end of the first bracket being fixedly connected to the first horizontal slider, and an end of the second bracket being fixedly connected to the second horizontal slider. The relative movement driving component 230 includes a drive motor and a transmission mechanism, the transmission mechanism being fixedly connected to the first horizontal slider and the second horizontal slider, respectively. The drive motor is driven by the transmission mechanism to bring the first horizontal slider and the second horizontal slider into a movement toward or away from each other along the horizontal sliding rail. As such, the relative movement driving component 230 may drive the first horizontal slider and the second horizontal slider to bring the first lifting component 210 and the second lifting component 220 into a movement, thereby changing a motion position state of the first lifting component 210 and the second lifting component 220.

Alternatively, the first lifting component 210 further includes a first vertical slider (not shown) moving along the first vertical slide rail, the first bearing portion 211 being fixedly connected to the first vertical slider. The second lifting component 220 further includes a second vertical slider (not shown) moving along the second vertical slide rail 222, and the second bearing portion 221 is fixedly connected to the second vertical slider. For example, a side, for carrying the transmission mechanism, of the bracket of the first bearing portion 211 may be fixedly connected to the first vertical slider.

Alternatively, the first vertical slide rail and the second vertical slide rail 222 are lead screws, and the first vertical slider and the second vertical slider are lead screw nuts. In this case, an up-down movement of the first bearing portion 221 or the second bearing portion in the vertical direction can be realized by simply connecting the motor to the lead screw to drive the lead screw to rotate by the motor.

Alternatively, the first lifting component 210 further includes a first driving belt (not shown) that is fixedly connected to the first vertical slider, and the first driving means is cooperatively connected to the first driving belt for driving the first vertical slider to move along the vertical slider. The second lifting component 220 also includes a second driving belt (not shown) that is fixedly connected to the second vertical slider, and the second drive means is cooperatively connected to the second driving belt for driving the second vertical slider to move along the vertical slider. By way of example, the first driving means may include a belt pulley cooperating with the first driving belt, and a motor. Through driving the belt pulley to rotate by the motor, the first driving pulley is brought to move, so that the first bearing portion 211 can be moved along the first vertical slide rail in the vertical direction.

Alternatively, the transmission mechanism adopts a synchronous belt (not shown) to perform transmission. A driving belt pulley and a driven belt pulley of the synchronous belt are respectively provided at both ends of the horizontal slide rail, and the two sides, between the driving belt pulley and the driven belt pulley, of the synchronous belt are fixedly connected to the first horizontal slider and the second horizontal slider, respectively. The driving motor is configured to drive the driving belt pulley to bring the first horizontal slider and the second horizontal slider to move synchronously.

It should be noted that movement directions of two parallel sides of the synchronous belt are opposite. Therefore, when the driving motor drives the driving belt pulley to rotate, the movement directions of the first horizontal slider and the second horizontal slider are opposite to each other so as to bring the first lifting component 210 and the second lifting component 220, which are fixedly connected to the first horizontal slider and the second horizontal slider respectively, toward and away from each other.

Alternatively, the alternating lifter 20 in the present embodiment further includes a first position sensor (not shown) for detecting a position of the first bearing portion 211 in the vertical direction, a second position sensor (not shown) for detecting a position of the second bearing portion 221 in the vertical direction, and a third position sensor (not shown) for detecting a position of the first horizontal slider in the horizontal direction, and a fourth position sensor (not shown) for detecting a position of the second horizontal slider in the horizontal direction. The above position sensors are used to monitor an operating state of the alternating lifter 20 to control the alternating lifter 20 to take a corresponding action.

For example, the position sensor may be a laser sensor or a travel switch. When a distance between the first bearing portion 211 and the second bearing portion 221 detected by the first position sensor and the second position sensor, respectively, is smaller than a preset distance and gradually decreases, it indicates that the first lifting component 210 and the second lifting component 220 are in the first position state, and the first bearing portion 211 and the second bearing portion 221 are moving toward each other. At this time, the first lifting component 210 and the second lifting component 220 can be driven to move away from each other by the relative movement driving component 230. When the distance between the first bearing portion 211 and the second bearing portion 221 detected by the first position sensor and the second position sensor, respectively, is larger than the preset distance and gradually increases, it indicates that the first lifting component 210 and the second lifting component 220 have passed through an interference region. At this time, the relative movement driving component 230 can be controlled to drive the first lifting component 210 and the second lifting component 220 to move toward each other. When a horizontal distance between the first bearing portion 211 and the second bearing portion 221 detected by a third position sensor and the fourth position sensor, respectively, is less than a preset threshold, it indicates that there is an overlapping area of projections of the first bearing portion 211 and the second bearing portion 221 in the vertical direction. When the horizontal distance between the first bearing portion 211 and the second bearing portion 221 detected by the third position sensor and the fourth position sensor, respectively, is greater than a preset threshold, it indicates that the projections of the first bearing portion 211 and the second bearing portion 221 in the vertical direction are completely staggered.

Figure 7:
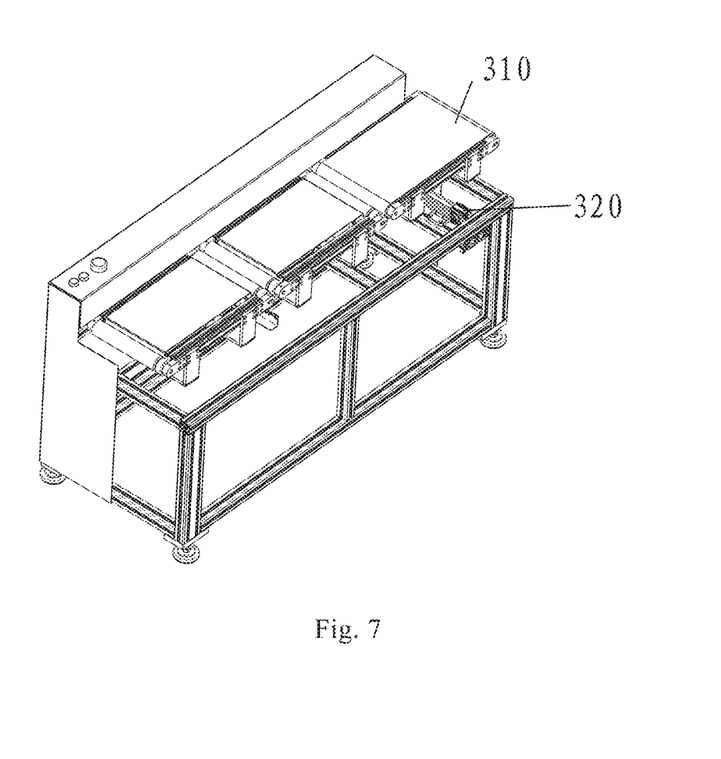
FIG. 7 is a schematic structural diagram of an upper packet section in an embodiment of the system for sorting articles of the present disclosure.

With continuing reference to FIG. 5 and with further reference to FIG. 7, FIG. 7 illustrates a schematic structural diagram of an upper packet section in a system for sorting articles of the present disclosure. In some alternative implementations of the present embodiment, the system further includes an upper packet section 30 for conveying the received articles to the alternating lifter 10. The upper packet section 30 includes an article transport assembly 310 and a position adjustment assembly 320, the article transport assembly 310 is configured to transport the articles in the horizontal direction, and the position adjustment assembly 320 is configured to adjust a horizontal position of the article transport assembly 310 to match the direction in which the article transport assembly transports the articles with the alternating lifter 20. In this way, it is possible to avoid the articles slipping from the device during transporting from the upper packet section 30 to the alternating lifter 20.

For example, the article transport assembly 310 may be an integral conveyor belt mechanism, and the position adjustment assembly 320 may include a motor, a slide rail, and a slider, a bracket carrying the conveyor belt being fixedly connected to the slider. The position adjustment assembly 320 drives the slider through the motor to move along the slide rail to change a lateral position of the article transport assembly 310, such that a centerline of the article transport assembly 310 is aligned with a centerline of the bearing portion of the alternating lifter 20. For another example, the article transport assembly 310 may also be a multi-section conveyor belt structure arranged linearly, an end conveyor belt being fixedly connected to the slider of the position adjustment assembly 320. The position adjustment assembly 320 drives the slider through the motor to move along the slide rail to change a lateral position of the end conveyor belt, such that a centerline of the end conveyor belt is aligned with a centerline of the bearing portion of the alternating lifter 20.

In some alternative implementations of the present embodiment, the system further includes a stacker 40 for handling the notches. The stacker 40 is configured to take out and stack a notch 170 storing the articles from the automatic put wall 10, and to move an empty notch to a designated position of the automatic put wall 10. In this way, automatic stacking and arrangement of the notches can be realized, and an automation level of the entire sorting system can be further improved.

In a specific example of the present embodiment, a work flow of sorting articles is: the to-be-sorted articles conveyed from the upper-package section 30 to the alternating lifter 20, then the to-be-sorted articles are conveyed by the alternating lifter 20 to a designated layer of the automatic put wall 10, and finally the to-be-sorted articles are conveyed by the automatic put wall to a designated notch. After the number of a articles in a notch reaches predetermined number threshold, the notch is removed from a side of the automatic put wall 10 by the stacker 40 and stacked. In the upper packet section 30 (for example, a scanning device), an information acquisition device may further be provided above the article conveying assembly 310 and used for acquiring sorting information (for example, notch information of a notch to which a to-be-sorted article is to be stored, represented by a two-dimensional code on a package of the to-be-sorted article) of the to-be-sorted articles, and then a control system for the system for sorting the article determines a conveying path of the alternating lifter 20 and the automatic put wall 10 according to the sorting information, so as to convey the to-be-sorted article to a specified position.

The above description is only a preferred embodiment of the present disclosure and is illustrative of the principles of the techniques employed. It will be appreciated by those skilled in the art that the scope of the invention referred to in the embodiments of the present disclosure is not limited to technical solution formed from specific combinations of the above-mentioned technical features, but also covers other technical solution formed from any combination of the above-mentioned technical features or equivalents thereof without departing from the inventive concept. For example, the above-described features and the technical features disclosed in the embodiments of the present disclosure (but not limited to), which have similar functions, are replaced with each other to form the technical solution.

What is claimed is:

1. An automatic put wall, comprising:
    a conveying bracket, and
    a tote bracket disposed at a lateral side of the conveying bracket;
    wherein the conveying bracket has a first multilayer structure, each layer of the first multilayer structure being provided with a set of sorting-conveying assemblies distributed linearly, and wherein each sorting-conveying assembly comprises a carrying portion and a rotating portion, the carrying portion is configured to carry and convey articles, and the rotating portion is configured to be connected to a base of the carrying portion to bring the carrying portion to rotate about a vertical; and
    wherein the tote bracket has a second multilayer structure, and each layer of the second multilayer structure is provided with a plurality of totes serving as the storage position for the article.

2. The automatic put wall according to claim 1, wherein the carrying portion comprises a conveyor belt and a horizontal driving mechanism, the horizontal driving mechanism is configured to drive the conveyor belt to move in a horizontal direction for conveying an article located on the conveyor belt.

3. The automatic put wall according to claim 2, wherein the carrying portion further comprises a tray, a central region of the tray is hollowed out to expose the conveyor belt, and an upper surface of the tray is not higher than an upper surface of the conveyor belt.

4. The automatic put wall according to claim 1, wherein the rotating portion comprises a rotating shaft having an axis in a vertical direction and a rotating driving mechanism, one end of the rotating shaft is fixedly connected to the base of the carrying portion, and the other end of the rotating shaft is connected to the rotating driving mechanism; and wherein the rotating driving mechanism is configured to drive the rotating shaft to rotate about the vertical axis.

5. The automatic put wall according to claim 4, wherein each sorting-conveying assembly comprises two carrying portions; and the rotating portion includes two rotating shafts, which are fixedly connected respectively to the base of each of the two carrying portions; and the rotating portion further comprises a synchronous transmission mechanism through which the rotating driving mechanism drives the two rotating shafts to rotate synchronously about respective vertical axes, so as to bring the two carrying portions to rotate synchronously about respective vertical axes.

6. The automatic put wall according to claim 5, wherein the synchronous transmission mechanism comprises a synchronous conveyor belt and two synchronous belt pulleys cooperating with the synchronous conveyor belt, each of the synchronous belt pulleys being connected to one of the rotating shafts; and the rotation driving mechanism is connected to the synchronous conveyor belt, and is configured to drive the synchronous conveyor belt to move, so as to bring the two synchronous belt pulleys and the rotating shafts connected to the synchronous pulleys to rotate about respective vertical axes.

7. The automatic put wall according to claim 1, further comprising an auxiliary roller and an auxiliary motor for driving the auxiliary roller to rotate, wherein the auxiliary roller is provided between a sorting-conveying assembly and the tote, and is driven by the auxiliary motor to move the article from the carrying portion to the storage position of the article.

8. The automatic put wall according to claim 1, further comprising a plurality of holding portions disposed at an article input end of the automatic put wall and corresponding to layers of the first multilayer structure, wherein each holding portion is configured to temporally store the article and convey the article to the set of sorting-conveying assemblies corresponding to the each layer of the first multilayer structure.

9. An article sorting system, comprising an automatic put wall and an alternating lifter, wherein the automatic put wall comprises at least one set of sorting-conveying assemblies distributed linearly, each sorting-conveying assembly comprises a carrying portion and a rotating portion, the carrying portion is configured to carry and convey articles, and the rotating portion is configured to be connected to a base of the carrying portion to bring the carrying portion to rotate about a vertical axis;

the alternating lifter is configured to convey a received article to the automatic put wall; and the automatic put wall is configured to convey the article conveyed by the alternating lifter to a designated tote.

10. The system according to claim 9, further comprising an upper packet section for conveying the received article to the alternating lifter; and the upper packet section comprises an article transport assembly for transporting the article in a horizontal direction, and a position adjustment assembly for adjusting a horizontal position of the article transport assembly to match a direction in which the article transport assembly transports the article with the alternating lifter.

11. The system of claim 9, further comprising a stacker for handling a tote, wherein the stacker is configured to remove and stack the tote storing articles from the automatic put wall, and to move an empty tote to a designated position on the automatic put wall.

* * * * *